United States Patent [19]

Clapp

[11] 3,767,570
[45] Oct. 23, 1973

[54] GRANULAR TO POWDERED ACTIVATED CARBON IN POLLUTED WATER PURIFICATION PROCESS

[75] Inventor: Kenneth Edward Clapp, Wilmington, Del.

[73] Assignee: Atlas Chemical Industries, Inc., Wilmington, Del.

[22] Filed: Sept. 22, 1971

[21] Appl. No.: 182,591

[52] U.S. Cl............................ 210/16, 210/33, 210/40
[51] Int. Cl............................ C02b 1/14, C02c 1/14
[58] Field of Search .................... 210/6, 7, 17, 18, 210/39, 40, 16, 30, 32, 33, 15; 252/411, 420

[56] References Cited
UNITED STATES PATENTS

| | | | |
|---|---|---|---|
| 1,027,715 | 5/1912 | Richter et al. | 252/411 R |
| 3,160,998 | 12/1964 | Payne | 252/411 R |
| 3,386,922 | 6/1968 | Schoeffel et al. | 210/32 X |
| 3,622,509 | 11/1971 | Shaler et al. | 210/33 X |
| 3,377,271 | 4/1968 | Cann | 210/7 X |
| 3,619,420 | 11/1971 | Kemmer et al. | 210/40 X |

OTHER PUBLICATIONS

Rudolfs, W. et al., "Activated Carbon Sewage Treatment," Sewage Works Journal, Vol. 7 Sept. 1935, pp. 852,863,880.
Culp, R. L., "Wastewater Reclamation at South Tahoe Public Utilities District," Jour. AWWA, Jan. 1968, pp. 84–94.

Primary Examiner—Samih N. Zaharna
Assistant Examiner—Thomas G. Wyse
Attorney—Kenneth E. Mulford et al.

[57] ABSTRACT

Process of purifying wastewater by contacting wastewater with an effective amount of spent granular activated carbon that has been ground to a powder. The resulting partially treated wastewater is then substantially separated from the powdered carbon-sludge contained therein and passed through a bed of granular activated carbon. As the granular activated carbon becomes spent, it is ground to a powder for contacting said wastewater.

13 Claims, 1 Drawing Figure

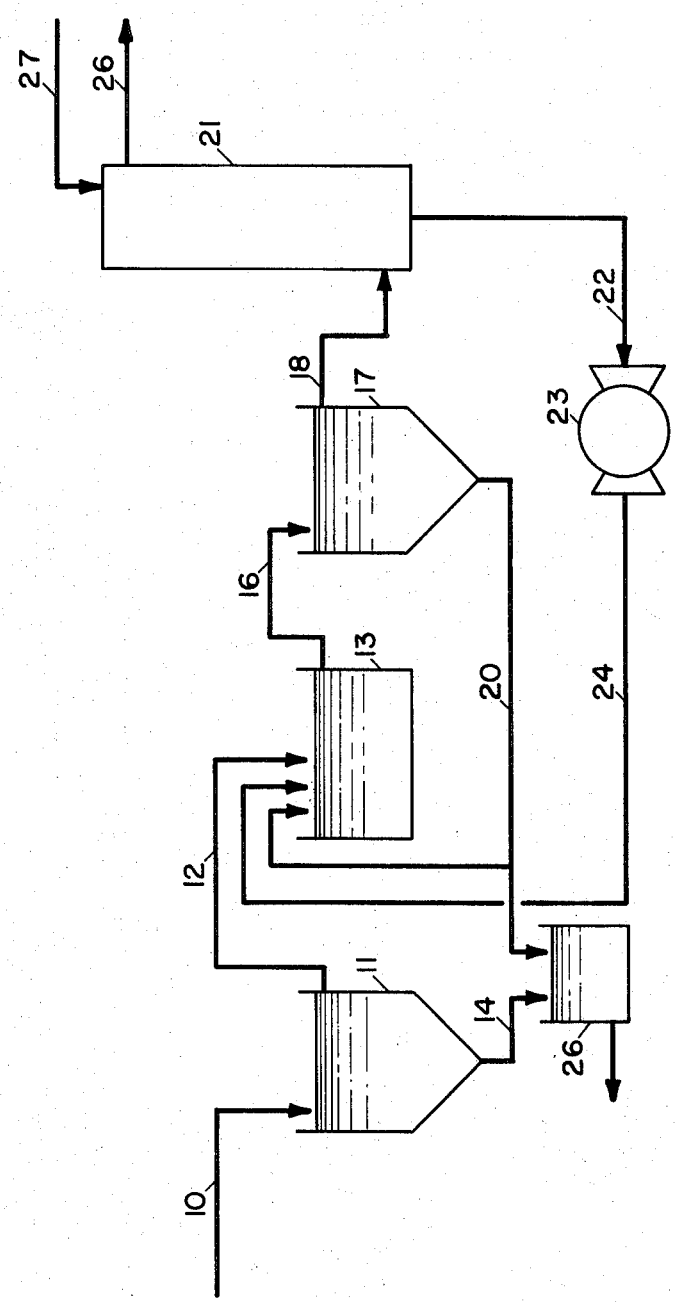

GRANULAR TO POWDERED ACTIVATED CARBON IN POLLUTED WATER PURIFICATION PROCESS

This invention relates to a process for removing impurities from polluted water or wastewater. Such polluted water or wastewater including sewage is generally derived from household and/or industrial waste.

Presently the most common methods of treating or purifying sewage involve the following procedures. First, the raw sewage is passed through a screen in order to remove large pieces of contaminants or debris such as broken branches from trees that may interfere with subsequent purification steps. The resulting sewage is then conveyed to one or more primary settling tanks where the heavy material in the sewage is allowed to settle. This settled material is known as primary sludge. The supernatent liquid fraction that forms on the top of the primary sludge in the primary settling tanks and which is withdrawn is known as primary effluent. The sludge from the primary settling tank and secondary settling tanks are combined and digested according to known aerobic or anaerobic digestion processes which tend to affect the decomposition of putrescible matter. The effluent that is obtained from the primary settling tanks is most often further purified by either an activated-sludge process or a trickling filter process.

The activated-sludge process consists of bringing sewage into intimate contact with air and biologically active sludge which has been previously produced by the activated-sludge process. In this process, the sewage that contains activated sludge flows through aeration tanks where air is added. From the aeration tank, the effluent is discharged into a final sedimentation tank where the activated sludge settles out. Most of this sludge is returned to the aeration tank, while a small amount is discharged to prevent the buildup of excess sludge solids. The supernatant effluent from the sedimentation tank is then either discharged into rivers or streams or given additional treatment by any of several processes.

In the trickling filter process, the effluent from the primary settling tanks is supplied in the form of a spray. This liquid spray is directed so that it will flow through a bed of stone, gravel, or other media providing liquid-/air surface area to underdrains under such a bed. By these underdrains, the resulting effluent is carried to final sedimentation tanks. From here the effluent is discharged into rivers or streams or given additional treatment by any of several processes.

Because of the great increase in population and industrialization, the volume of wastewater such as sewage and other polluted water has greatly increased. Due to this factor, our rivers and streams have become increasingly polluted and the need for improved sewage treatment processes is clearly needed.

It is, therefore, an object of the present invention to provide a new and improved process for treating wastewater.

Another object of the present invention is to provide a new and improved process for treating sewage and/or polluted water derived from household, institutional, and/or industrial waste.

These and other objects of the present invention are accomplished by a process comprising treating wastewater with an effective amount of spent granular activated carbon that has been ground to a powder.

In a particular application of the present process for treating sewage, an effective amount of spent granular activated carbon that has been ground to a powder is added to the supernatant effluent from primary settling tanks. This mixture of primary effluent and powdered activated carbon is aerated by some suitable process such as by trickling filter or the activated-sludge process. Following the aeration process, the resulting aerated mixture is conveyed to secondary settling tanks wherein the resulting sludge is allowed to settle and the effluent from the secondary settling tanks is fed through a bed of granular activated carbon for further purification. The granular activated carbon in this bed when spent is ground into a powder for addition to the effluent from the primary settling tanks.

As will be recognized by those skilled in the present art, by the term "spent granular activated carbon" as used herein is meant granular carbon that has adsorbed into its structure such an amount of offending wastewater pollutants that the carbon is no longer able to produce effluent water of desired quality. More particularly, the term "spent granular activated carbon" is definitive of a granular activated carbon that has adsorbed into its pore structure amounts of pollutants that would typically amount to between about 0.05 and 0.5 pounds per pound of granular activated carbon.

The following description with reference to the accompanying schematic FIGURE will further serve to illustrate an embodiment of the present invention.

Screened raw sewage 10 is fed into primary settling tank 11. Supernatant primary effluent 12 is withdrawn from the primary settling tank 11 and fed into aeration tank 13. Aeration tank 13 is the type used in the conventional activated-sludge process and is provided with a supply of air or oxygen-enriched air under vigorous agitation. Spent granular activated carbon 22 is withdrawn from the bottom of carbon column 21 and fed as a slurry into wet grinder 23. Spent granular activated carbon is ground to an aqueous powder slurry 24 and conveyed from wet grinder 23 to aeration tank 13 so that it may be thoroughly mixed and contacted with effluent 12 in tank 13. After a suitable dwell time, the activated sludge mixture 16 from aeration tank 13 is fed into secondary settling tank 17. The supernatant secondary effluent 18 from secondary settling tank 17 is fed to the bottom of granular carbon column 21 and final effluent 26 exits column 21. Virgin granular activated carbon 27 is fed into the top of column 21 in an amount equal to the spent carbon 22 that is withdrawn from the bottom of column 21. Sufficient activated sludge 20 required for the activation process is circulated back to aeration tank 13. Obviously activated sludge 20 contains powdered activated carbon. Therefore, the concentration of the powdered activated carbon in aeration tank 13 will vary dependent in part on the amount of activated sludge 20 that must be recirculated to the aeration step due to the particular apparatus used and the nature of the sewage being treated. However, in general the sewage primary effluent being aerated, such as in tank 13, will contain from about 500 to 5,000 parts per million (p.p.m.) of powdered activated carbon according to the present process. The excess activated sludge 20 is combined with the sludge 14 coming from primary settling tank 11. This combined sludge is subjected to a digestion process in tank 26 and further treatments wherein the solid matter is separated and dried. The digestion process can be anaerobic or aerobic. In general, the sludge being digested will contain an effective amouunt, normally about 2 to 20 percent by weight on a dry basis, of the subject powdered activated carbon. Table I contains data applicable to the present process and the above description and drawing as it relates to a municipal-type sewage treatment system. The numbers under the heading "Flow" in Table I refer to the various flows or feeds as shown on the present schematic drawing.

B. Chemical oxygen demand (COD) — The quantity of oxygen expressed in parts per million (p.p.m.) consumed under specific conditions in the oxidation of the organic and oxidizable in organics contained in water and wastewater corrected for the influence of chlorides (see Methods for Examination of Water and Waste Water, 12th Edition, Public Health Association, New York, N.Y., 1965, pp. 510–514).

In accordance with the present invention, the subject spent granular activated carbon that has been ground

TABLE I

| Flow | Description | Units | Example value | Range |
|---|---|---|---|---|
| 10 | Degritted sewage | Mil. gal./day | 10.0 | |
| 12 | Primary effluent | do | 9.9 | |
| 14 | Primary sludge | do | .1 | Wide variation depending on size of municipality; Flow 10 = 0.1–1,000. |
| 18 | Secondary effluent | do | 9.86 | |
| 20 | Secondary sludge | do | .04 | |
| 26 | Carbon column effluent | do | 9.86 | |
| 27 | Carbon flow rate | Lbs./day | 2,500 | 10–100 p.p.m. on Flow 10 or 80–800 lbs./mil. gal. |

(1) Million gallons per day.

In such a municipal type sewage treatment facility as illustrated above the residence or dwell times of the sewage or sewage fragments is as follows:

Tank 11 — Normally about 2 hours. Range is usually 1 to 4 hours.

Tank 13 — Normal aeration time is 3 to 6 hours. Range is usually 2 to 24 hours. Recycled sludge residence time in this tank is from 5 to 15 days.

Tank 17 — Normally about 2 hours. Range can be 1 to 4 hours.

Tank 21 — Average residence time of liquid is 5 to 60 minutes.

With reference to the data given in Table I above, degritted or screened raw sewage 10 has a COD within the range of about 50 to 1,000. The BOD of flow 10 is generally within the range of about 30 to 500. In general, secondary effluent 18 has a COD within the range of about 15 to 50. The BOD of secondary effluent 18 is most often within the range of about 5 to 30. Final effluent 26 from carbon column 21 generally has a COD of from about 5 to 25 and a BOD of from about 1 to 5. Sludge 20 contains from about 5,000 to 25,000 p.p.m. solids, and the powdered carbon in sludge 20 is within the range of from about 2,000 to 20,000 p.p.m. Obviously the above values may vary widely dependent on the nature of the wastewater being treated, the particular treatment apparatus being utilized, and the degree of treatment desired.

Table II below illustrates a specific example of the concentration of wastes that are present in the various flows of the subject process as illustrated in Table I.

TABLE II

| Flow | Description | COD | BOD | Solids (ppm) |
|---|---|---|---|---|
| 10 | Degritted Sewage | 250 | 150 | — |
| 12 | Primary Effluent | 120 | 80 | — |
| 18 | Secondary Effluent | 25 | 10 | — |
| 26 | Final Effluent | 10 | 2 | — |
| 20 | Sludge | — | — | 10,000 |
| 20 | Powder Carbon in Sludge | — | — | 7,000 |

For the purpose of the present specification, the definition of terms COD and BOD are as follows:

A. Biochemical oxygen demand (BOD) — The quantity of oxygen expressed in parts per million utilized in the biochemical oxidation of organic matter in 5 days at 20° C.

to a powder can also be added to raw wastewater or raw sewage. Normally such an addition is made after the raw sewage has been screened but before any other treatment. With the addition of the present powdered activated carbon to raw sewage, accelerated decomposition and settling rates are obtained in the primary settling tank.

The present invention also includes contacting raw wastewater or raw sewage with any of the common known flocculants and/or inorganic chemicals which are suitable for removing suspended solids, phosphates or other waste components. Generally, such flocculants or inorganic chemicals are added to the raw sewage just after screening. For example, among the flocculants that can be used are anionic, cationic, and nonionic polyelectrolytes. For example, polyacrylamides and their copolymers, carboxyalkyl cellulose or sulfoalkyl cellulose can be used. Other suitable flocculants can be found listed in U.S. Pat. No. 3,455,820.

Therefore, in accordance with the present invention, raw sewage can be treated after screening with (a) the subject powdered activated carbon, (b) polyelectrolytes or phosphate removing chemicals or (c) a combination of (a) and (b).

With the process of the present invention granular if carbon treatment of secondary effluent is accomplished entirely with virgin granular activated carbon having the highest possible adsorptive capacity. After the granular activated carbon has become spent it is ground to a powder whereby additional surface area and relatively inaccessible pores are exposed that would have remained unavailable if the carbon had remained in the granular state. Thus by first using granular activated carbon to adsorb the residual solids from the secondary effluent and then grinding the spent granular activated carbon for addition to the primary effluent or sludge or raw sewage is indicated much greater total use is obtained from the activated carbon without having to regenerate either the granular or powdered forms. Additionally, because of the presence of powdered activated carbon during the aeration, settling and digestion processes of sewage treatment enhanced biological degradation is obtained. Further the presence of the powdered activated carbon in the settling tanks enhances the settling rate and its presence during all of the sewage treatment stages reduces odor.

Hence, by the term "effective amount" as used herein is meant sufficient concentration of activated carbon to achieve some or all of the above specified benefits of the present process.

Any type of commercially available granular activated carbon is suitable for use in the present process. These granular carbons are typically prepared from lignite, peat, or medium-volatile bituminous coal and should be sufficiently low cost and grindable to be economically feasible in the present process. Such granular activated carbons typically have surface areas of 400 to 1,500 square meters per gram, pore volumes of 0.6 to 1.2 milliliters/gram and bulk densities of 0.35 to 0.55 grams/milliliters. Such a granualr carbon would have a U.S. Std. mesh size within the range of from 4 mesh to 40 mesh. Typical fractions of such a carbon would be 8 × 30, 8 × 35, and 12 × 40.

The spent granular activated carbon that is ground to a fine powder for use in the present process is ground to a U.S. Std. mesh size of 100 mesh or less. Typically such a powdered carbon will contain 50 to 100 percent that will pass through a 325 mesh. However, the various particle size fractions within the general range will vary dependent on what particular grinding device is utilized. For example, with some grinding devices fractions of from minus 100 to 400 U.S. Std. mesh size will be obtained. With other grinding devices 5 to 20 percent of the powdered carbon many pass through a 400 U.S. Std. mesh. However, as stated above the desired results are obtained is the present powdered activated carbon has a U.S. Std. mesh size of 100 mesh or less.

It has been determined in accordance with the present process that the loading or quantity of granular activated carbon required will vary to a large degree dependent on the nature of the wastewater and the efficiency of the particular purification equipment utilized. In general about 1 to 5 pounds of granular activated carbon are required per each pound of COD removal. However, in most instances only 1½ to 3 pounds of granular activated carbon per each pound of COD removal is required.

In regard to the subject powdered activated carbon loading, when used in the activated sludge process it has been determined that from about 0.2 to about 1.0 pounds of powdered activated carbon is required for each pound of COD removal with the more normal requirement being within the range of 0.3 to 0.6 pounds of powdered activated carbon per each pound of COD removal.

What is claimed is:

1. A process for treating wastewater which comrpsies contacting wastewater with an effective amount of spent granular activated carbon that has been ground to a powder, separating the partially treated wastewater from the resulting powdered carbon-sludge, passing the partially treated wastewater through a bed of granular activated carbon, and grinding granular activated carbon that has become spent in a wastewater treating process for contacting said wastewater.

2. A process of claim 1 wherein the powdered activated carbon is prepared from spent granular activated carbon that has been previously used as a filtering and absorption means in the same treating process.

3. A process of claim 1 wherein the wastewater is contacted with the powdered activated carbon during the aeration stage of the activated-sludge process.

4. A process of claim 1 wherein the resulting powdered carbon-sludge is digested aerobically or anaerobically.

5. A process of claim 1 wherein the powdered spent granular activated carbon will pass through a U.S. Standard mesh of 100 mesh or less.

6. A sewage treatment process which comprises
adding an effective amount of a spent granular activated carbon that has been ground to a powder to the supernatant effluent from a primary settling tank,
aerating the resulting mixture,
removing settled sludge from the aerated mixture, passing resulting secondary supernatant effluent through a bed of granular activated carbon, and
grinding said granular activated carbon that has become spent into a powder for addition to the effluent from said primary settling tank.

7. A process of claim 6 that is an activated-sludge process wherein the powdered activated carbon and supernatant effluent from a primary settling tank are charged into an aeration tank.

8. A process of claim 6 that is a trickling filter process wherein the powdered activated carbon and supernatant effluent from a primary settling tank are charged into a trickling-filter system.

9. A process of claim 6 wherein the mixture being aerated contains about 500 to 5,000 parts per million powdered activated carbon.

10. A process of claim 7 wherein the mixture being aerated contains about 500 to 5,000 parts per million powdered carbon.

11. A process of claim 6 wherein the sludge from the primary settling tank and sludge from the settled aerated mixture are digested in mixture with an effective amount of spent granular activated carbon that has been ground to a powder.

12. A process of claim 11 wherein the sludge being digested contains from about 2 to 20 percent by weight of said powdered carbon, on a dry basis.

13. A process of claim 6 wherein the powdered spent granular activated carbon will pass through a U.S. Standard mesh screen of 100 mesh or less.

* * * * *